(12) United States Patent
Turner (10) Patent No.: US 10,035,472 B1
(45) Date of Patent: Jul. 31, 2018

(54) CONVERTIBLE TRAILER HITCH FOR BIKE RACK, HAMMOCK AND PICNIC TABLE STAND

(71) Applicant: Jeffrey W. Turner, Penhook, VA (US)

(72) Inventor: Jeffrey W. Turner, Penhook, VA (US)

(\*) Notice: Subject to any disclaimer, the term of this patent is extended or adjusted under 35 U.S.C. 154(b) by 0 days.

(21) Appl. No.: 15/485,999

(22) Filed: Apr. 12, 2017

Related U.S. Application Data

(60) Provisional application No. 62/321,304, filed on Apr. 12, 2016.

(51) Int. Cl.
| | |
|---|---|
| *B60R 9/10* | (2006.01) |
| *B60R 9/06* | (2006.01) |
| *A45F 3/22* | (2006.01) |
| *A47B 85/06* | (2006.01) |
| *A47B 3/10* | (2006.01) |

(52) U.S. Cl.
CPC ............... *B60R 9/10* (2013.01); *A45F 3/22* (2013.01); *A47B 3/10* (2013.01); *A47B 85/06* (2013.01); *B60R 9/06* (2013.01)

(58) Field of Classification Search
CPC ... B60R 9/06; B60R 9/10; B60R 11/00; Y10S 224/924

USPC .................................................. 224/519–521
See application file for complete search history.

(56) References Cited

U.S. PATENT DOCUMENTS

| | | | | |
|---|---|---|---|---|
| 6,662,983 | B2 * | 12/2003 | Lane | B60R 9/06 108/44 |
| 6,739,643 | B1 * | 5/2004 | Rock | B60N 2/3011 296/64 |
| 7,565,990 | B2 | 7/2009 | Bryan, IV | |
| 9,179,759 | B1 * | 11/2015 | Turner | A45F 3/22 |
| 9,254,790 | B2 * | 2/2016 | Dreger | B60R 9/10 |
| 2008/0230579 | A1 * | 9/2008 | Wang | B60R 9/10 224/400 |

\* cited by examiner

*Primary Examiner* — Adam Waggenspack
(74) *Attorney, Agent, or Firm* — Charles S. Sara; DeWitt Ross & Stevens S.C.

(57) ABSTRACT

A convertible system adapting a trailer hitch for use as a combination bicycle rack and hammock stand or picnic table stand includes a bicycle carrier rack designed for attachment to a standard vehicle. The bicycle carrier rack can be expanded into an outwardly extended configuration to form a platform stand for receiving a platform, such as a hammock or a picnic table.

14 Claims, 7 Drawing Sheets

CONVERTIBLE TRAILER HITCH FOR BIKE RACK, HAMMOCK AND PICNIC TABLE STAND

FIELD OF THE INVENTION

The present invention is directed to a convertible system adapting a trailer hitch for use as a combination bicycle rack and hammock stand or picnic table stand. The system is adapted for use both on a ground surface stand and attached to a trailer hitch of a vehicle.

DESCRIPTION OF PRIOR ART

Bicycle racks, which can be removably attached to a vehicle, are well known to art. These can take the form of racks which are mounted to the back (or front) of a vehicle by mounting straps or racks which include a trailer hitch situated at the rear of a vehicle generally in or underneath the rear bumper. In this manner, the bicycle rack includes a trailer hitch post which includes a standard hitch mechanism, known to the art, for slidably inserting and attaching the distal end of the trailer hitch post to the trailer hitch secured to the vehicle.

While bicycle racks are known, the idea of a convertible bicycle rack which can be morphed or changed into a secondary useful structure has not yet been contemplated. There is no disclosure of a convertible bicycle rack which is designed to be used for the purpose of a platform stand, such as a stand for a hammock, table or the like.

SUMMARY OF THE INVENTION

The system includes a vehicle trailer hitch support, free-standing legs, a bicycle rack portion, and a table top having an exemplary configuration as shown in the Figures. Specifically, the present invention is directed to a convertible bicycle carrier for a vehicle wherein the bicycle carrier converts to a platform stand, comprising a mainframe assembly, which includes an assembly shaft having a first end, a second end and a center-mounted perpendicularly-oriented crosspiece connected to mainframe assembly at a position generally equidistant from the first end and the second end, wherein the crosspiece comprises a first upper surface, a second lower surface and two parallel sidewalls communicating with the first upper surface and second lower surface to form a shaft having an open passageway extending from a first open end to a second open end, wherein the parallel sidewalls include a set of communicating crosspiece securement passageways located near the first open end of the cross piece. The mainframe assembly further includes a first hinge cup at the first end of the mainframe assembly and a second hinge cup at the second end of the mainframe assembly, wherein each of the first and second hinge cups comprise a first open end and a second closed end, wherein the second closed end comprises a back support wall bordered by parallel side walls, wherein each of the parallel sidewalls includes first, second and third sets of communicating securement passageways.

Rotatably mounted to the mainframe assembly is a pair of first and second removable side arms wherein each side arm has a first end and a second end, wherein each of the first and second side arms comprise a first section extending from the first end and a second section extending to the second end, wherein the first section is generally perpendicular to the second section, wherein the first and second side arms include a first top surface, a second bottom surface and parallel side walls, wherein the first ends of the first and second side arms are adapted to hingedly communicate with the first and second hinge cups on the mainframe to affix the first and second side arms in a first inwardly communicating position or a second outwardly extending position;

The device of the present invention further includes a pair of first and second removable base stands for providing a base to the platform stand when the first and second side arms are positioned in the second outwardly extended position, a bicycle rack mount slidably and removably received within the second open end of the mainframe assembly cross piece, the bicycle rack mount including a first end and a second end, wherein the bicycle rack mount comprises a first extension defined by the first end of the bicycle rack mount for placement and securement within the second open end of the cross piece and a second extension, which second extension is vertically attached to the first extension, wherein the second extension is defined by a first open end forming a channel within the second extension, and a bicycle rack removably connected to the bicycle rack mount, the bicycle rack comprising a set of parallel bicycle supports for supporting a bicycle during transit by the vehicle.

The objects and advantages of the invention will appear more fully from the following detailed description of the preferred embodiment of the invention made in conjunction with the accompanying photographs and drawings.

DESCRIPTION OF THE INVENTION

Figure 1:
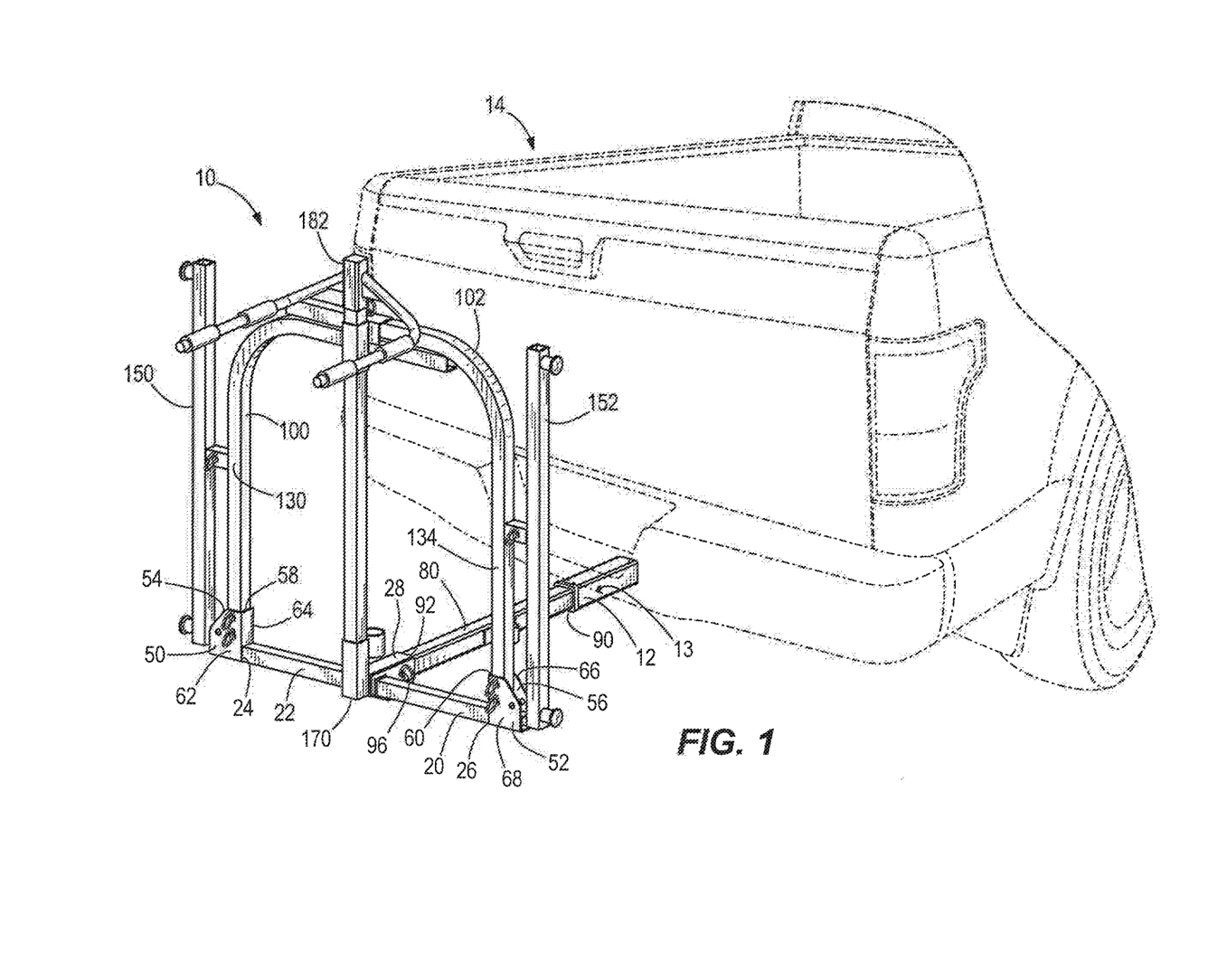
FIG. 1 illustrates a perspective front view of the device of the present invention attached to a vehicle (in phantom).

Referring now to the drawings and particularly FIG. 1, the present invention is directed to a bicycle rack/platform device 10 for attachment to a standard trailer hitch 12 of a vehicle 14, shown in phantom. As illustrated in FIG. 1, the trailer hitch 12 has a securement passageway 13 to assist in connecting the device 10 to the trailer hitch 12. Referring to FIGS. 1-4, the device 10 is comprised of a mainframe assembly 20, including an assembly shaft 22 having a first end 24, a second end 26 and a center-mounted perpendicularly-oriented crosspiece 28 connected to mainframe assembly 20 at a position generally equidistant from the first end 24 and the second end 26.

The crosspiece 28 includes a first upper surface 30, a second lower surface 32 and two parallel sidewalls 34, 36 communicating with the first upper surface 30 and second lower surface 32 to form a shaft having an open passageway 38 extending from a first open end 40 to a second open end 42, wherein the parallel sidewalls 34, 36 include a set of communicating crosspiece securement passageways 44 located near the first open end 40 of the crosspiece 28.

The first end 24 of the mainframe assembly 20 is defined by a first hinge cup 50 and the second end 26 of the mainframe assembly 20 is defined by a second hinge cup 52. Each of the hinge cups 50, 52 has a first open end 54, 56 and a second closed end 58, 60, wherein the second closed end 58, 60 comprises a back support wall bordered by parallel side walls, designated parallel side walls 62, 64 in hinge cup 50 and parallel side walls 66, 68 in hinge cup 52. Each of the parallel sidewalls 62, 64, 66 and 68 includes first 70, second 72 and third 74 sets of communicating securement passageways.

Figure 2:
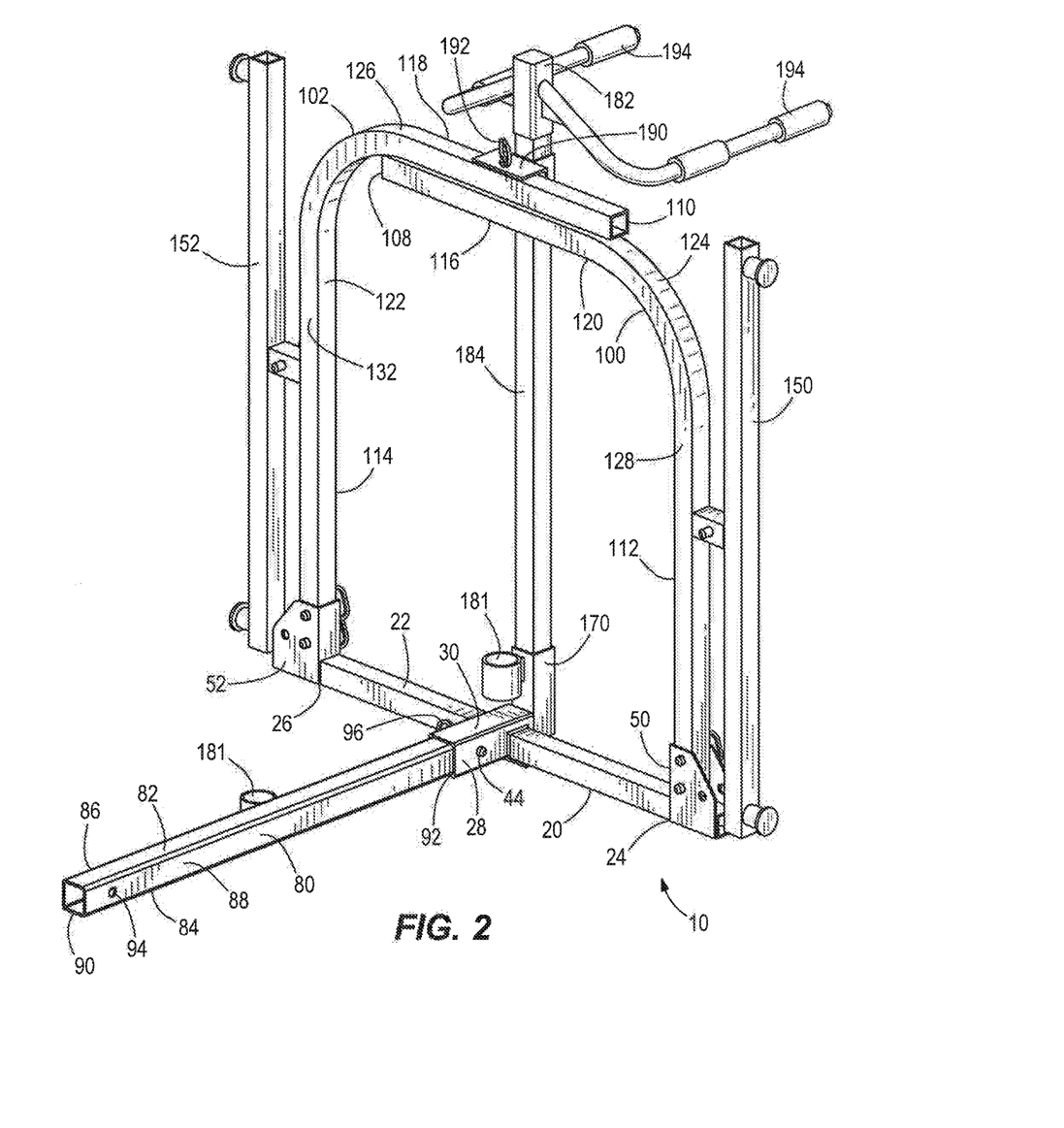
FIG. 2 illustrates a perspective rear view of the device of FIG. 1.

The device 10 is further defined by a removable extension bar 80 with a first upper surface 82, a second lower surface 84 and communicating parallel sidewalls 86, 88 forming a first end 90 and a second end 92, wherein the first end 90 is adapted to be releasably attached to the trailer hitch 12 of vehicle 14, as illustrated in FIG. 1. As best illustrated in FIG. 2, the second end 92 is adapted to be slidably interfitted within the open passageway 38 of the crosspiece 28 and secured thereto. The extension bar parallel sidewalls 86, 88 include a communicating securement passageway 94 near the second end 92 of the extension bar 80 for communicating with the crosspiece securement passageway 44. A securing pin 96, such as a cotter pin known to the art, passes through the crosspiece securement passageway 44 and the securement passageway 94 to removably lock the extension bar 80 to the crosspiece 28 in a manner known to the art, as illustrated in FIGS. 1 and 2.

Likewise, the first end 90 of the extension bar 80 includes a securement passageway 96 for communicating with the securement passageway 13 in the trailer hitch 12 to removably lock the device 10 to the rear of the vehicle 14 as illustrated in FIG. 1. A securing pin (not illustrated), similar to pin 96, is designed pass through the securement passageway 94 of extension bar 80 and securement passageway 13 of the trailer hitch 12 when the two securement passageways 13, 94 are in alignment as illustrated in FIG. 1.

Figure 3:
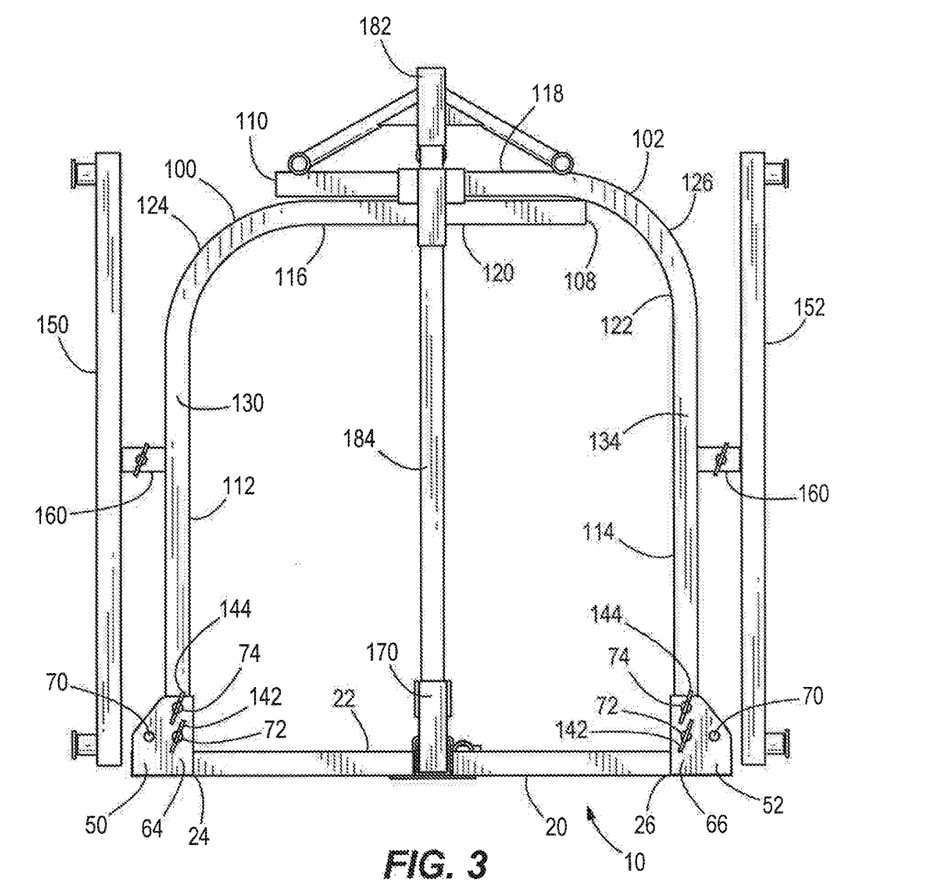
FIG. 3 illustrates front plan view of the device of FIG. 1.
Figure 6:
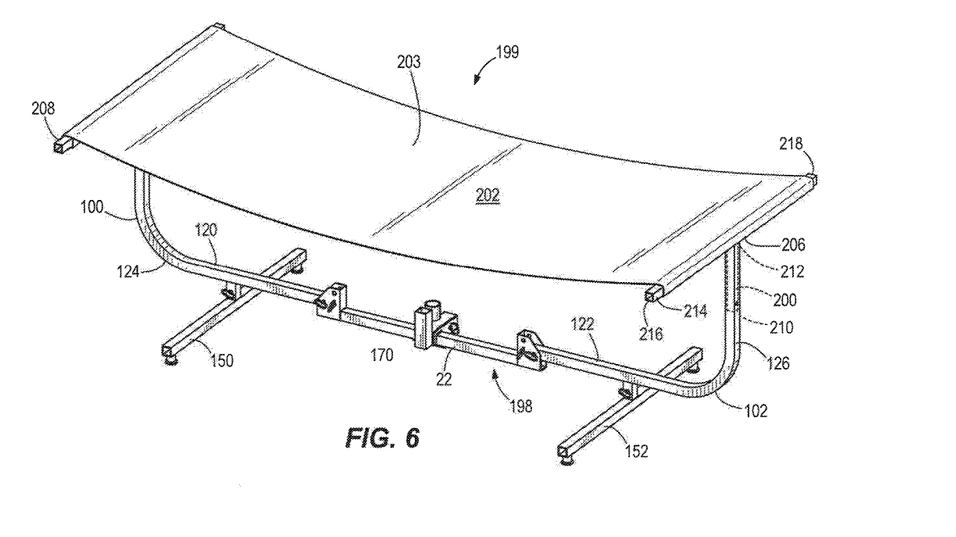
FIG. 6 illustrates a perspective view of an alternate view of the device of FIG. 1 in combination with a hammock.
Figure 7:
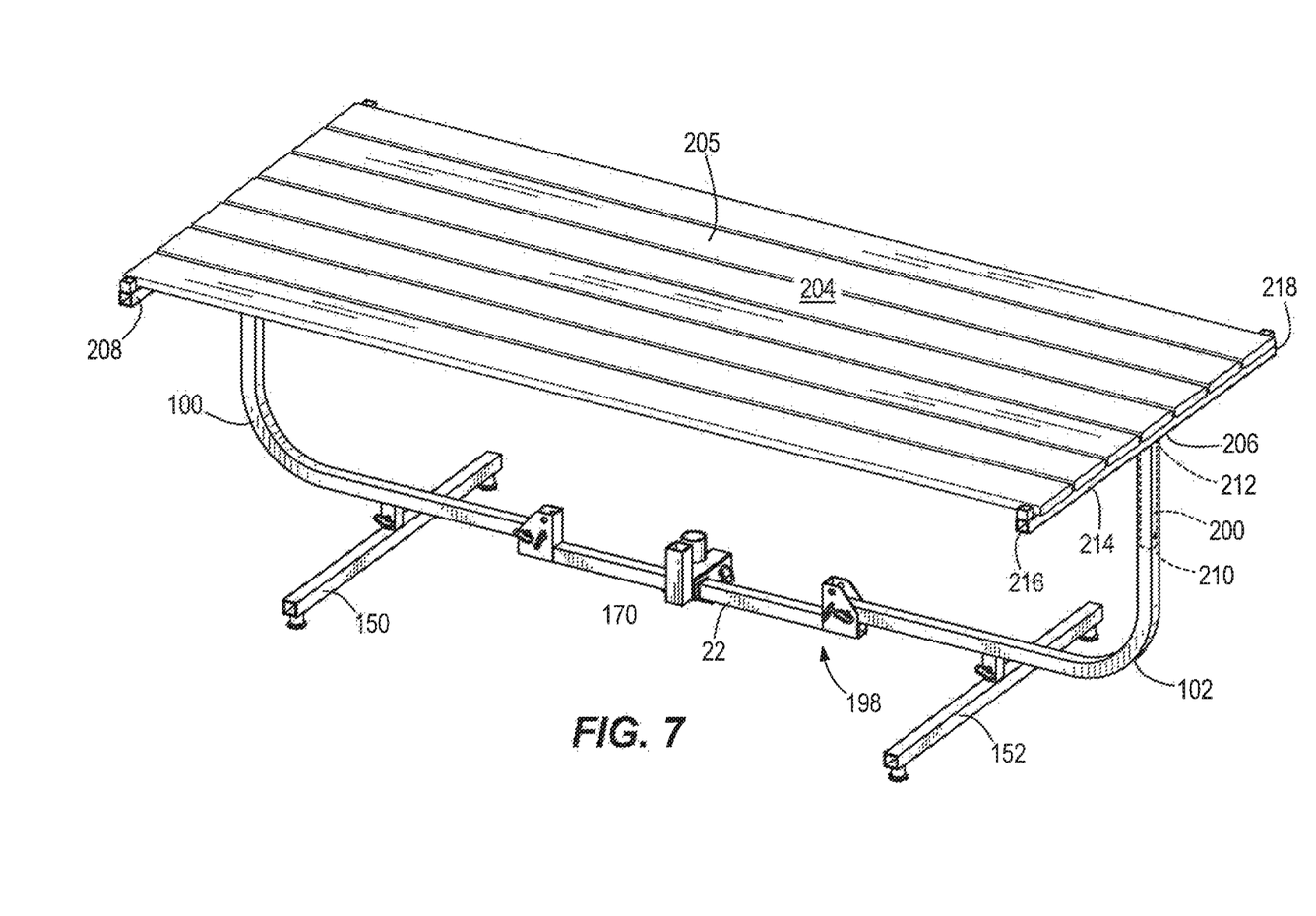
FIG. 7 illustrates a perspective view of an alternate view of the device of FIG. 1 in combination with a table.

The device 10 further includes a pair of first and second removable side arms 100, 102 adapted to receive center posts or legs 200 of a platform 199 such as a hammock 202, illustrated in FIG. 6, or a table 204, illustrated in FIG. 7, wherein each side arm 100, 102 has a first end 104, 106 and a second end 108, 110. The first ends 104, 106 of the first and second side arms 100, 102 are adapted to hingedly communicate with the first and second hinge cups 50, 52 on the mainframe assembly 20, as illustrated in FIGS. 1-3. Each of the first and second side arms 100, 102 comprise a first section 112, 114 extending from the first end 104, 106 and a second section 116, 118 extending to the second end 108, 110 of the side arms 100, 102, wherein the first sections 112, 114 are generally perpendicular to the second sections 116, 118. The side arms 100, 102 include first top surfaces 120, 122, second bottom surfaces 124, 126 and parallel side walls 128, 130 one the first side arm 100 and side walls 132, 134 on the second side arm 102.

Figure 4:
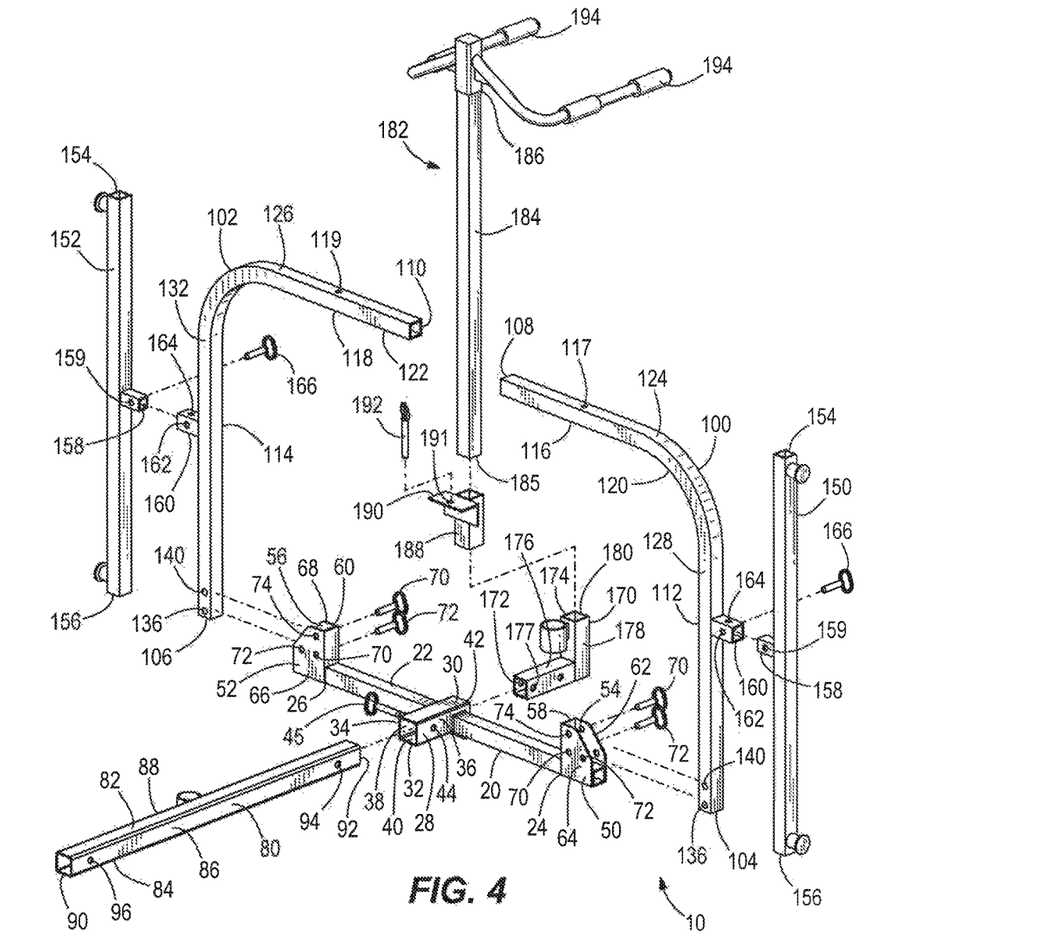
FIG. 4 illustrates an exploded view of the device of FIG. 1.
Figure 5:
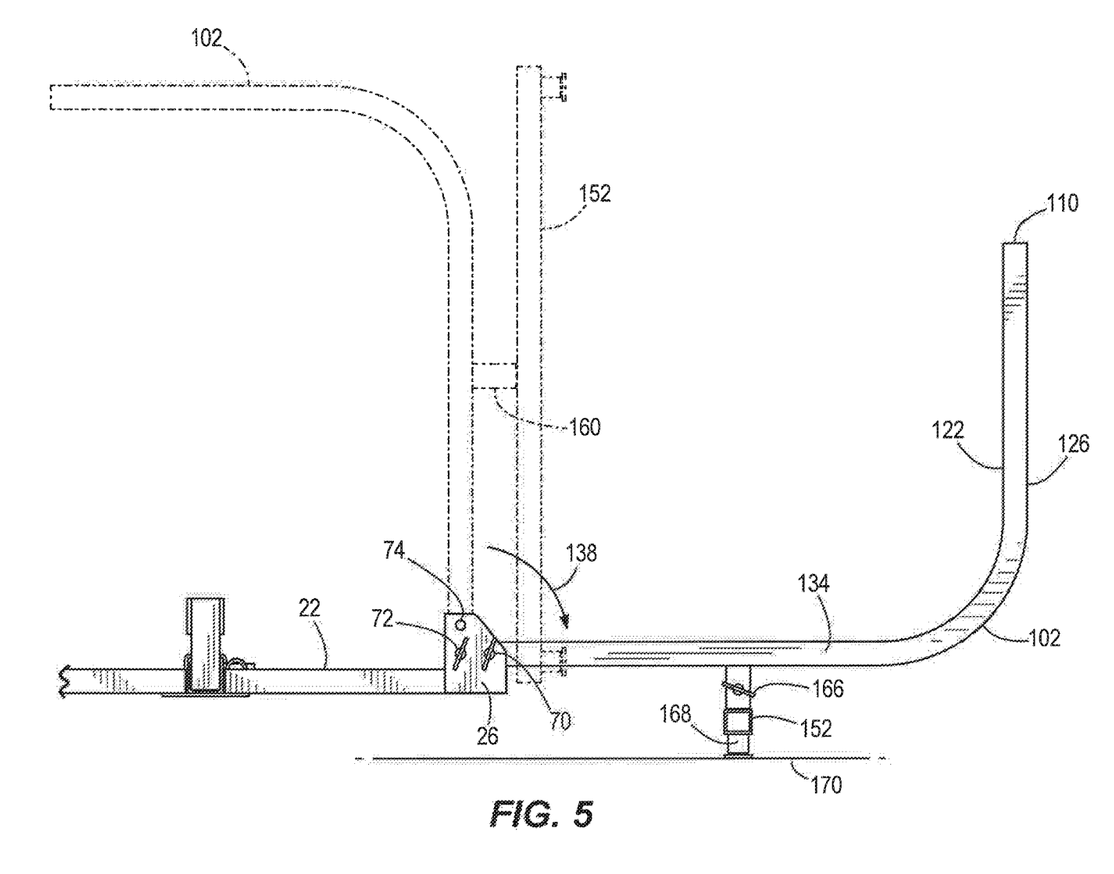
FIG. 5 illustrates a side plan view of a sidearm of the device of FIG. 1.

The first ends 104, 106 of each of the first and second side arms 100, 102 include a first securement passageway for rotatably securing the first and second removable side arms 100, 102 in a first inwardly communicating position, as illustrated in FIGS. 1, 2 and 4, wherein the attachment mechanism comprises a first communicating securement passageway 136 adapted to interact with the first communicating passageway 70 of the first and second hinge cups 50, 52 to enable the side arms 100, 102 to hingedly rotate about an axis, illustrated by arrow 138 on FIG. 5. The first ends 104, 106 of the first and second side arms 100, 102 further include a second securement passageway 140 for fixedly securing the side arms 100, 102 in either a first inwardly communicating position forming the bicycle rack, illustrated in FIGS. 1-3, or a second outwardly extended position forming the platform stand, illustrated in FIGS. 6 and 7. The side arms 100, 102 are rotatably affixed to the hinge cups 50, 52 by means of securing pins 142.

As illustrated in FIG. 3, the second securement passageway 140 of the side arms 100, 102 communicate with the third securement passageways 4 of the hinge cups 50, 52 to releasably lock the side arms 100, 102 in the first inwardly communicating position, illustrated in FIGS. 1-3. The side arms 100, 102 are affixed to the hinge cups 50, 52 by means of securing pins 144. It is noted that the length of the first section 112 of the first side arm 100 is slightly less than the length of the first section 114 of the second side arm 102 such that the first side arm 100 is positioned in a nested arrangement with the second side arm 102 when the first side arm 100 and the second side arm 102 are positioned in the first inwardly communicating position as illustrated in FIGS. 1-3.

Referring to FIG. 5, the first securement passageway 70 on the hinge cups 50, 52 can interact with the second securement passageway 140 on the side arms 100, 102 to releasably lock the side arms 100, 102 in the second outwardly extended position, illustrated in FIGS. 5-7. To accomplish this, the securing pin 144, which locks the side arms 100, 102 to the third securement passageway 74 of the hinge cups 50, 52 is removed. The side arms 100, 102 are then extended outwardly, as illustrated in FIG. 5 with reference to side arm 102, along axis arrow 138 until the second section 112, 114 of the side arms 100, 102 are positioned in substantial parallel alignment with the assembly shaft 22 of the mainframe assembly 20, wherein the second securement passageway 140 of the side arms 100, 102 is in alignment with the first securement passageway 70 of the hinge cups 50, 52. The securing pins 144 are then reinstalled resulting in the side arms extending in the second outwardly extended position, illustrated in FIGS. 5-7.

Referring to FIGS. 1-4, the device 10 further includes a pair of first and second removable base stands 150, 152 for providing a base to the device 10 when the first and second side arms 100, 102 are positioned in the second outwardly extended position, as illustrated in FIGS. 5-7. Referring to FIG. 4, each of the first and second base stands 150, 152 include a first end 154, a second end 156 and a centrally positioned mounting post 158 for removable attachment to the first and second side arms 100, 102. The first and second side arms 100, 102 further include a receiving passageway 160 for removably receiving and connecting the removable base stands 150, 152 to the first and second side arms 100, 102 when the side arms 100, 102 are being stored on the device 10 in "bicycle rack" mode, as illustrated in FIGS. 1-4. The mounting posts 160 include a first communicating securement passageway 162 and a second communicating securement passageway 164 to enable the base stands 150, 152 to be placed parallel to the side arms 100, 102 in the first inwardly communicating position using securement passageway 162 interacting with securement passageway 159, as illustrated in FIGS. 1-4, and perpendicular to the side arms 100, 102 in the second outwardly extended position using securement passageway 164 interacting with securement passageway 159, as illustrated in FIGS. 5-7. A pair of securing pins 166 releasably lock the base stands 150, 152 to the side arms 100, 102 in the inwardly communicating position, illustrated in FIGS. 1-4, and the outwardly communication position, illustrated in FIGS. 5-7. The base stands 150, 152 may further include adjustment feet 168, known to the art, for positioning the base stands 150, 152 on the ground 170, as illustrated in FIGS. 5-7.

Referring to FIGS. 1-4, a bicycle rack mount 170 adapted to be slidably and removably received within the second open end 42 of the mainframe assembly cross piece 28, as best illustrated in FIG. 4. The bicycle rack mount 170 includes a first end 172 and a second end 174. The bicycle rack mount 170 comprises a first extension 176 defined by the first end 172 for releasable placement and securement within the second open end 42 of the crosspiece 28. The bicycle rack mount 170 is further defined by a second perpendicularly situated extension 178, which second extension is vertically attached to the first extension 176, wherein the second extension 178 is defined by a first open end 180 forming a channel within the second extension 178. The first extension 176 includes a communicating securement passageway 177 designed to interact with the set of communicating crosspiece securement passageways 44 located near the first open end 40 of the cross piece 28. A securing pin releasably secures the bicycle rack mount 170 to the cross piece 28. A utility cup 181 may be provided either to the bicycle rack mount 170 or the extension 80 to provide a number of functions, such as an umbrella stand, drink holder, etc.

A bicycle rack 182 comprising a vertical support bar 184 having a first end 185 and a second end 186, wherein the first end 185 is designed to be slidably and removably interfitted with the channel formed in the first open end 180 of the bicycle rack mount 170. A mounting collar 188 is designed to be slidably received by the support bar 184 of the bicycle rack 182 and slidably placed near the second end 186. The mounting collar 188 includes a mounting shelf 190 designed to rest on the bottom surface 126 of the second section 118 of the side arm 102, as best illustrated in FIG. 2. The mounting shelf 190 includes a securement passageway 191 which is designed to interact and communicate with securement passageway 119 of side arm 102 and securement passageway 117 of side arm 100, when the side arms 100, 102 are in nested arrangement, as illustrated in FIGS. 1-3. A securing pin 192 passes through securement passageways 117, 119 and 191 to removably lock the mounting collar 188 to the nested side arms 100, 102. Further securement passageways and securing pins may be included on the support bar 184 and the bicycle rack mount 170 or the mounting shelf 190 as necessary to secure the bicycle rack 182 to the device 10 as necessary. The second end 186 of the vertical support bar 184 includes at least one set of parallel bicycle supports 194, known to the art, for supporting a bicycle (not illustrated) during transit by the vehicle 14.

Converting the bicycle rack device 10 to a platform stand 198 configuration, as illustrated in FIGS. 6 and 7, is a relatively simple task. The bicycle rack device 10, as illustrated in FIG. 1, is removed from the trailer hitch 12 of the vehicle 14, by methods already known to the art. The bicycle rack 182 is then removed from the device 10 by reversing the process described above. The securing pin 192 is removed from the side arms 100, 102 and any other securement devices attaching the bicycle rack 182 are also removed. The bicycle rack 182 is then slidably removed from first open end 180 of the bicycle rack mount 170 and set aside. The bicycle rack mount 170 may or may not be removed from the mainframe assembly as desired. The first and second base stands 150, 152 are then removed from the receiving passageway 160 and rotating ninety degrees. The base stands 150, 152 are then reinserted into the receiving passageway 160 and the securing pin 166 is secured thereto by insertion into and through the securement passageways 159 and 164. The side arms 100, 102 are then moved to the outwardly extended position, as illustrated in FIG. 5 and described above. In this manner, the device 10 is now extended to be a platform stand 198 as illustrated in FIGS. 6 and 7.

A platform 199 adapted for placement on the platform stand 198 may then be releasably installed onto the platform stand 198. As illustrated in FIG. 6, the platform 199 may be a hammock 202. As illustrated in FIG. 7, the platform 199 may be a table 204. It is understood that the platform 199 can be other pieces of furniture. The platform 199 is generally constructed with a first support structure 206 and second support structure 208, wherein each support structure comprises a center post or leg 200, illustrated in phantom in FIGS. 6 and 7, having a first end 210 and a second end 212. The second end 212 of the center post 200 is rigidly attached to a cross bar 214 in a generally perpendicularly oriented manner with respect to the center post 200, wherein each cross bar 214 has a first end 216 and a second end 218. The center post 200 of each of the first and second support structures 206, 208 are adapted to slidably interfit within the second ends 108, 110 of the first and second side arms 100, 102.

As illustrated in FIG. 6, the hammock 202 comprises a fabric covering 216 extending from the cross bar 214 of the first support structure 206 to the cross bar 214 of the second support structure 208. As illustrated in FIG. 7, the table 204 comprises a rigid surface 205 extending from the cross bar 214 of the first support structure 206 to the cross bar 214 of the second support structure 208.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within the range, whether specifically disclosed or not. Further, these numerical ranges should be construed as providing support for a claim directed to any number of subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated reference, the patent disclosure controls.

The devices, methods, compounds and composition of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A convertible bicycle carrier for a vehicle wherein the bicycle carrier converts to a platform stand, comprising:
   a. a mainframe assembly, including:
      i. an assembly shaft having a first end, a second end and a center-mounted perpendicularly-oriented crosspiece connected to the mainframe assembly at a position generally equidistant from the first end and the second end, wherein the crosspiece comprises a first upper surface, a second lower surface and two parallel sidewalls communicating with the first upper surface and second lower surface to form a shaft having an open passageway extending from a first open end to a second open end, wherein the parallel sidewalls include a set of communicating crosspiece securement passageways located near the first open end of the cross piece,
      ii. a first hinge cup at the first end of the mainframe assembly and a second hinge cup at the second end of the mainframe assembly, wherein each of the first and second hinge cups comprise a first open end and a second closed end, wherein the second closed end comprises a back support wall bordered by parallel side walls, wherein each of the parallel sidewalls includes first, second and third sets of communicating securement passageways;
   b. a pair of first and second removable side arms wherein each side arm has a first end and a second end, wherein each of the first and second side arms comprise a first section extending from the first end and a second section extending to the second end, wherein the first section is generally perpendicular to the second section, wherein the first and second side arms include a first top surface, a second bottom surface and parallel side walls, wherein the first ends of the first and second side arms are adapted to hingedly communicate with the first and second hinge cups on the mainframe to affix the first and second side arms in a first inwardly communicating position or a second outwardly extending position;
   c. a pair of first and second removable base stands for providing a base to the platform stand when the first and second side arms are positioned in the second outwardly extended position;
   d. a bicycle rack mount slidably and removably received within the second open end of the mainframe assembly cross piece, the bicycle rack mount including a first end and a second end, wherein the bicycle rack mount comprises a first extension defined by the first end of the bicycle rack mount for placement and securement within the second open end of the cross piece and a second extension, which second extension is vertically attached to the first extension, wherein the second extension is defined by a first open end forming a channel within the second extension; and
   e. a bicycle rack removably connected to the bicycle rack mount, the bicycle rack comprising a set of parallel bicycle supports for supporting a bicycle during transit by the vehicle.

2. The bicycle carrier of claim 1 further comprising a removable extension bar, wherein the extension bar comprises a first upper surface, a second lower surface and communicating parallel sidewalls forming a first end and a second end, wherein the first end is adapted to be releasably attached to a trailer hitch of the vehicle, and wherein the second end is adapted to be slidably interfitted within the second open end of the crosspiece and secured thereto, wherein the extension bar parallel sidewalls include a set of communicating securement passageways near the second end of the extension bar for communicating with the crosspiece securement passageways.

3. The bicycle carrier of claim 1 wherein the first ends of the first and second side arms include an attachment mechanism for rotatably securing the first and second side arms in a first inwardly communicating position for interaction with the first communicating passageway of the first hinge cup on the mainframe to enable the side walls to hingedly rotate about an axis formed by the first securement passageways, wherein the first ends of the first and second side arms include a set of first and second communicating securement passageways for interaction with the first and second communicating passageways of the first and second hinge cups on the mainframe to enable the side walls to hingedly rotate about an axis formed by the first securement passageways, and wherein the second set of securement passageways secure the first and second side arms to the mainframe in a first inwardly communicating position.

4. The bicycle carrier of claim 1 wherein the first and second removable base stands comprise a first end, a second end and a centrally positioned mounting post for placement on the first sections of the first and second side arms, wherein the first and second side arms include a receiving passageway for removably receiving and connecting the removable base stands to the first and second side arms.

5. The bicycle carrier of claim 4 wherein the mounting post comprises first and second communicating securement passageways for attaching the base stands in a position parallel to the side arms in the first inwardly communicating position or perpendicular to the side arms in the second outwardly extended position.

6. The bicycle carrier of claim 1 wherein the first and second base stands include adjustment feet for positioning the base stands.

7. The bicycle carrier of claim 1 wherein the length of the first section of the first side arm is less than the length of the first section of the second side arm to position the first side arm in a nested arrangement with the second side arm when the first side arm and the second side arm are positioned in the first inwardly communicating position.

8. The bicycle carrier of claim 1 wherein the first extension of the bicycle rack mount includes a communicating securement passageway designed to interact with the set of communicating crosspiece securement passageway located near the first open end of the cross piece, wherein the communicating securement passageway is connected to the communicating crosspiece securement passageway by a securing pin.

9. The bicycle carrier of claim 1 wherein the bicycle rack comprises a vertical support bar having a first end and a second end, wherein the first end of the support bar is slidably and removably interfitted with the channel within the second extension of the bicycle rack mount, wherein the first end of the support bar includes a communicating securement passageway.

10. The bicycle carrier of claim 9 wherein the second extension of the bicycle rack mount includes a communicating securement passageway for releasably locking the first end of the vertical support bar to the bicycle rack mount.

11. The bicycle carrier of claim 1 further comprising a platform for attachment to the platform stand when the platform stand is in the second outwardly extended position.

12. The bicycle carrier of claim 11 wherein the platform is a hammock.

13. The bicycle carrier of claim 11 wherein the platform is a table.

14. The bicycle carrier of claim 11 wherein the platform comprises a first and second support structure, wherein each of the first and second support structures comprise a center post having a first end and a second end, wherein the second end of the center post is rigidly attached to a cross bar in a generally perpendicularly oriented manner with respect to the center post, wherein the first ends of the first and second support structures are adapted to slidably interfit within the second ends of the first and second side arms.

\* \* \* \* \*